UNITED STATES PATENT OFFICE.

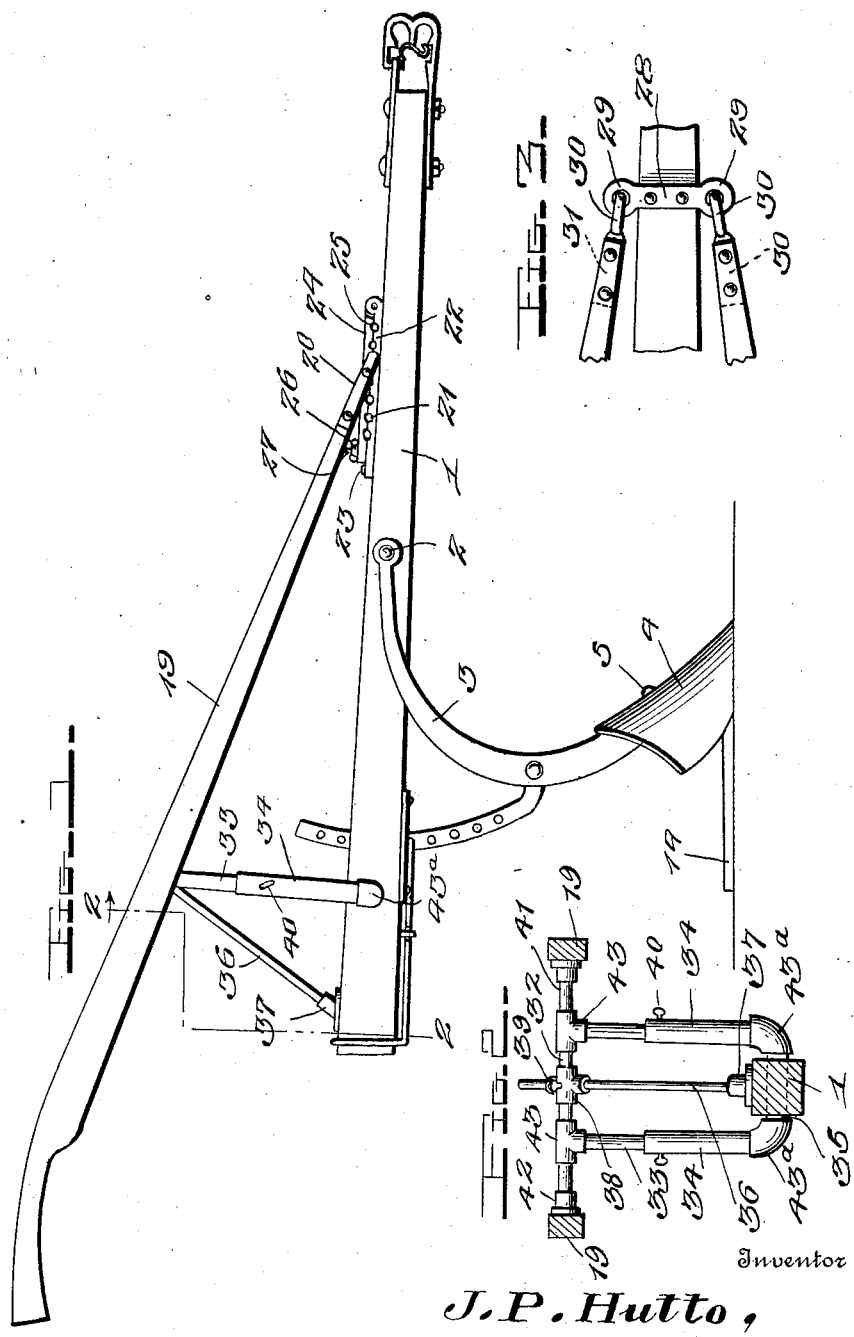

JOSEPH P. HUTTO, OF PELION, SOUTH CAROLINA.

PLOW.

1,050,833. Specification of Letters Patent. Patented Jan. 21, 1913.

Application filed March 21, 1912. Serial No. 685,279.

*To all whom it may concern:*

Be it known that I, JOSEPH P. HUTTO, a citizen of the United States, residing at Pelion, in the county of Lexington and State of South Carolina, have invented certain new and useful Improvements in Plows, of which the following is a specification, reference being had to the accompanying drawings.

This invention relates to plows and particularly to cultivators where an adjustment is necessary between the separate parts to cause the tools to operate in a way suited to the crop undergoing cultivation.

The invention has for its object the provision of means whereby the handles may be readily adjusted both longitudinally of the beam and angularly with relation thereto and also whereby the tool standard may be adjusted angularly in order to cause the same to penetrate more or less deeply into the soil.

A further object of the invention is the provision of these adjustable features in a plow of which the parts may be readily assembled and disassembled for repairs or renewal.

Having these objects in view the invention resides in the particular features and combinations set forth in the appended claims and hereinafter fully described in connection with illustrative drawings wherein is shown a preferred and modified embodiment of the invention.

In these drawings Figure 1 is a side elevation of a plow embodying the improvements of this invention. Fig. 2 is a transverse sectional view on the line 2—2 of Fig. 1. Fig. 3 is a fragmentary top plan view showing parts hereinafter specifically described.

Corresponding and like parts are referred to in the following description and designated in the accompanying drawings by like reference characters.

Referring to the drawings in detail the reference numeral 1 designates the plow beam to which is pivoted at 2 the curved tool standard 3 carrying the share 4 which may be of any suitable type and secured to the standard in the usual manner by bolts 5.

The plow handles 19 are preferably connected at their forward end by a transverse strap or bar 20 which is adapted to rest within any one of the transverse grooves 21 of the rack 22 which is secured to the forward portion of the beam in any suitable manner as, for instance, by the bolts 23. At the forward end of the rack is hingedly connected a duplicate rack member 24 having grooves formed upon its lower face at 25 which grooves register with the grooves 21 when the plates overlie each other, the latter rack serving as a cover for the former. The hinged rack cover 24 is arranged to be held securely upon the rack 22 by means of a wing nut 26 engaging a threaded stud 27, whereby the transverse strap 20 is firmly secured in place with reference to the beam.

As an optional method of connecting the forward end of the plow handles to the beam a plate 28 may be rigidly secured to the beam and provided at its ends with eyes 29 within which engage the hooks 30 of straps 31 attached to the end of the plow handles and adapted to be bent upon themselves to prevent their withdrawal from the eyes 29. In this case the connection between the handles and beam is a pivotal one but is not adjustable longitudinally.

In their medial portion the handles are connected by a cross bar 32 having depending therefrom vertical slide rods 33 arranged to telescopically engage within tubular members 34 which at their lower portion are connected by a transverse member 35 which passes through the plow beam at the rear of the slot 9 forming a pivotal connection at this point for the tubular members 34. A brace 36 is fixed to the beam at 37 and has a slidable engagement at 38 with the cross bar 32. A set screw 39 serves to hold the brace in adjusted position with reference to the bar, and set screws 40 secure the telescopic members 34 in adjusted position.

The cross bar and telescopic members may be of any ordinary construction to obtain the action described but the conformation and relation of the parts is such that I am able to and do employ in this connection for purpose of convenience, economy of first cost and ease of renewal ordinary pipe and pipe fittings, the cross bar being constituted of pipe lengths 41 attached to the handles 19 by sockets 42 and with the slide rods 33 by T's 43. The members 33 may likewise be pipe sections threaded into the T's 43 of the telescopic members 34 which are likewise pipe sections of a larger size connected by the elbows 44 with the transverse member 35 also formed of a pipe section. The connection 37 of the brace 36 with the plow beam may be by an inclined socket as shown, into which the brace 36 is threaded. The rectangular construction employed by me makes possible the utilization of stock tubular material in this way to very great advantage from the standpoint of cheapness and efficiency.

By loosening the set screws 39 and 40 the handles may be raised or lowered to suit the operator and the nature of the soil under cultivation, the longitudinal adjustment of the connection between the forward end of the handles and the beam enables a proper correspondence of the adjusted parts to be attained.

While the parts of my invention thus far described may be employed to great advantage with a draft attachment of the usual construction I prefer to employ as particularly advantageous in this connection, a clevis of the form shown.

Having thus described my invention, I claim:

1. In a plow, a longitudinally-adjustable connection between the forward ends of the handles and beam, in combination with a vertically telescopic connection between the medial portion of the handles and the beam, and an inclined brace connecting the beam and handles in slidable relation to one of the same, and means to fix the connections in adjusted relation.

2. In a plow, a longitudinally adjustable connection between the forward ends of the handles and beam, in combination with a pivoted vertically telescopic connection between the medial portion of the handle and the beam, an inclined rigid brace fixed on the beam and slidably connected to the handle, and means to fix the connection in adjusted relation.

3. In a plow, a rack fixed upon the upper face of the beam in its forward portion, a second rack overlying the first, a connection between the forward ends of the plow handles and lying within the grooves formed between the opposing faces of the rack, means to clamp the upper rack member upon the lower, a cross bar connecting the handles in their medial portion, slide rods depending therefrom, tubular members pivotally connected to the rear portion of the plow beam and arranged to receive the slide rods in telescopic relation, and set screws to hold the telescopic members in adjusted relation.

4. In a plow, a rack fixed upon the upper portion of the beam in its forward portion, a second rack overlying the first and hinged thereto at one end, a connection between the forward ends of the plow handles and lying within the grooves formed between the opposing faces of the rack, releasable means to clamp the upper rack member upon the lower and upon the interposed member connecting the plow handles, a cross bar connecting the handles in their medial portion, a pair of slide rods depending from the cross bar, a pair of tubular members pivoted below to the rear portion of the beam and extending vertically on each side of the beam to receive the slide rods in telescopic relation, a rigid brace fixed at the rear end of the plow beam and extending upwardly at an incline to a slidable connection with the cross bar, and set screws to hold the telescopic members in adjusted relation one to the other and a set screw to hold the cross bar in adjusted position on the brace.

5. In a plow, a rack fixed upon the upper portion of the beam in its forward portion, a second rack overlying the first and hinged thereto at one end, a connection between the forward ends of the plow handles and lying within the grooves formed between the opposing faces of the rack, releasable means to clamp the upper rack member upon the lower and upon the interposed member connecting the plow handles, a cross bar connecting the handles in their medial portion and composed of pipe sections connected to the handles by flanged sockets, T's on the inner ends of the pipe sections, other pipe sections on the inner sides of the T's and a fourway coupling connecting the inner ends of these latter pipe sections, pipe sections connected to and depending vertically from the T's, a pipe section extending transversely of the rear end of the beam, elbows on each end thereof, pipe sections connected to the elbows and extending forwardly to receive in telescopic relation the pipe sections depending from the T's, an inclined pipe socket upon the rear end of the beam, a pipe section threaded therein and extending through the fourway coupling in slidable relation, and set screws mounted in the overlapping ends of the telescopic pipe sections, and a set screw mounted in the fourway coupling.

6. In a plow, a transverse strap connecting the forward ends of the handles, means for adjustably connecting said strap to the forward end of the beam, a cross bar rotatably mounted within the medial portion of the handles, arms depending from said cross bar, a transverse member pivotally mounted within the beam, tubular members extending from said last mentioned transverse member, and means for adjustably holding said depending arms with said tubular members, substantially as described.

7. In a plow, means for pivotally connecting the forward ends of the handles and beam, in combination with a cross bar pivotally mounted within the medial portion of the handles, a pair of parallel depending side bars permanently mounted upon said cross bar, a pair of tubular members pivotally mounted upon said beam, means for adjustably holding said side bars within said tubular members, a diagonally extending brace bar permanently mounted upon the beam, and means for adjustably holding said cross bar upon said diagonal brace, substantially as described.

In testimony whereof I hereunto affix my signature in the presence of two witnesses.

JOSEPH P. HUTTO.

Witnesses:
J. D. HALLIWANGER,
W. M. YONCE.

Copies of this patent may be obtained for five cents each, by addressing the "Commissioner of Patents, Washington, D. C."